(12) United States Patent
Zakharia et al.

(10) Patent No.: US 7,305,242 B2
(45) Date of Patent: Dec. 4, 2007

(54) SYSTEM, APPARATUS, AND METHOD FOR FACILITATING LINK SELECTION ON ELECTRONIC DEVICES

(75) Inventors: Sany Zakharia, Helsinki (FI); Niko Eiden, Helsinki (FI)

(73) Assignee: Nokia Corporation, Espoo (FI)

( * ) Notice: Subject to any disclaimer, the term of this patent is extended or adjusted under 35 U.S.C. 154(b) by 426 days.

(21) Appl. No.: 10/197,245

(22) Filed: Jul. 17, 2002

(65) Prior Publication Data

US 2004/0204128 A1  Oct. 14, 2004

(51) Int. Cl.
*H04Q 7/20* (2006.01)

(52) U.S. Cl. ............... 455/456; 455/457; 455/566; 455/411

(58) Field of Classification Search ........... 455/456, 455/457, 566, 411, 436, 461
See application file for complete search history.

(56) References Cited

U.S. PATENT DOCUMENTS

| | | | | |
|---|---|---|---|---|
| 5,436,945 | A | * | 7/1995 | Weisel et al. ............... 376/287 |
| 6,028,604 | A | * | 2/2000 | Matthews et al. ........... 715/821 |
| 6,487,424 | B1 | * | 11/2002 | Kraft et al. .................. 455/566 |
| 6,683,627 | B1 | * | 1/2004 | Ullmann et al. ............. 715/786 |
| 2001/0034696 | A1 | * | 10/2001 | McIntyre ..................... 705/37 |
| 2001/0053685 | A1 | * | 12/2001 | Mori et al. .................. 455/411 |
| 2002/0044156 | A1 | * | 4/2002 | Maezawa et al. ........... 345/698 |
| 2002/0052209 | A1 | * | 5/2002 | Frohlund ..................... 455/456 |
| 2002/0091736 | A1 | * | 7/2002 | Wall ............................ 707/513 |
| 2002/0109687 | A1 | * | 8/2002 | Ishii et al. ................. 345/472.2 |
| 2003/0157970 | A1 | * | 8/2003 | Kraft et al. .................. 455/566 |
| 2003/0174160 | A1 | * | 9/2003 | Deutscher et al. .......... 345/716 |

OTHER PUBLICATIONS

W3C, Cascading Style Sheets, level 2 CSS2 Specification [online]. W3C Recommendation May 12, 1998; REC-CSS2-19980512 [retrieved on Jan. 9, 2003]. Retrieved from the Internet:<URL: http:www.w3.prg/TR/1998/REC-CSS2-19980512/>Table of Contents, Chapter 5.
W3C, Selectors [online]. W3C Candidate Recommendation Nov. 13, 2001 [retrieved on Jan. 9, 2003]. Retrieved from the Internet: http://www.w3.org/TR/css3-selectors/#useraction-pseudos>.
W3C, CSS3module: Color [online]. W3C Working Draft Apr. 18, 2002 [retrieved on Jan. 9, 2003]. Retrieved from the Internet: http://www.w3.org/TR/css3-color/.

* cited by examiner

*Primary Examiner*—Matthew Anderson
*Assistant Examiner*—Minh Dao
(74) *Attorney, Agent, or Firm*—Hollingsworth & Funk, LLC

(57) ABSTRACT

A system, apparatus, and method for facilitating selection of selectable links presented on a display using an enhanced hovering technique. At least one snap area associated with a link is defined, where the snap area includes a region extending beyond the boundaries of the particular link. Movement of a cursor is facilitated to allow a user to move the cursor over the snap area of the particular link when presented on the display. One or more characteristics of the particular link are modified when the cursor is hovering within the snap area of the particular link, thereby indicating that the link may be selected by the user.

42 Claims, 7 Drawing Sheets

SYSTEM, APPARATUS, AND METHOD FOR FACILITATING LINK SELECTION ON ELECTRONIC DEVICES

FIELD OF THE INVENTION

This invention relates in general to mobile communications, and more particularly to a system, method, and apparatus for facilitating selection of selectable links via an enhanced hovering technique.

BACKGROUND OF THE INVENTION

Both landline and wireless computing systems are presently capable of receiving information in a variety of content types and formats, from a variety of different sources including networked sources. Landline systems, such as desktop computers, workstations, terminals, etc. generally utilize commercially-available Web browsers in order to interact with various kinds of Internet resources. This type of browser is generally a software program stored locally at the client device. In the Internet context, web content created with Hypertext Markup Language (HTML) or other language can be read by such Web browsers.

Analogous technologies exist for communicating landline content via wireless devices. For example, one such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is generally independent of wireless network standards, and is designed as an open standard. WAP bridges the gap between the wireline Internet paradigm and the wireless domain, to allow wireless device users to enjoy the benefits of the Internet across both platforms. Other current and anticipated technologies are also used or contemplated for use in communicating content to and from wireless devices. In order to view or otherwise consume such Internet content via wireless devices using WAP, a WAP browser may be utilized. Other analogous browsers may be used for different wireless protocols.

Content from the Internet or other networked sources will be increasingly consumed on smaller devices. For example, the popularity and resulting proliferation of portable and hand-held wireless devices has confirmed the need to make Internet web pages and other content available to mobile device users. However, there are various factors that limit the ability of a user to efficiently consume Internet content via mobile terminals. One such factor is the relatively limited input capabilities available on mobile terminals as compared to wireline desktop computers and workstations. This is primarily due to the limited space available on mobile terminals, where small device size is otherwise highly desirable for purposes of portability. Another factor is the relatively limited display capabilities on mobile terminals, again due to the limited display screen size.

The small displays and reduced usability of mobile terminals make the consumption of Internet content challenging, as Internet content is typically designed and formatted for consumption on desktop or other wireline platforms used with high-resolution displays and advanced input capabilities. Because a mobile device's display is smaller and has a much lower resolution than that of larger desktop systems, Internet content must be scaled down when rendered onto the smaller display screens. Thus, a page with many links (e.g., Internet hyperlinks) will be scaled down such that the linked components and the spacing therebetween will be significantly reduced when rendered onto the smaller display. Thus, the display screen may appear cluttered with links, that are difficult to visually distinguish, and difficult to select using graphical selection tools. This, coupled with the relatively limited input capabilities available on mobile terminals, can create significant difficulties for the user to accurately move and position graphical selection tools (e.g., cursor) in order to select a particular link from a page being viewed on the mobile terminal display. It may even be difficult to discern whether the cursor is hovering over a link at all, or whether a link has indeed been selected.

Browsing difficulties are not limited to mobile terminals however. A user's ability to browse and otherwise consume Internet content on desktop and other wireline computers can be limited by the user himself/herself. For example, the user can have a disability, making it difficult to precisely move a graphical cursor with a mouse, joystick, etc. This is true even where the display link is provided on a full-size monitor in the size originally intended by the author or content provider. The problem is exacerbated when the device being used is a mobile device having a smaller display and/or limited input capabilities.

Accordingly, there is a need in the communications industry for a manner of facilitating link or other item selection using browsers and other applications that present selectable links/items. The present invention fulfills these and other needs, and offers other advantages over the prior art approaches.

SUMMARY OF THE INVENTION

To overcome limitations in the prior art described above, and to overcome other limitations that will become apparent upon reading and understanding the present specification, the present invention discloses a system, apparatus and method for facilitating selection of selectable links via an enhanced hovering technique.

In accordance with one embodiment of the invention, a method is provided for facilitating user selection of links presented on an electronic device display. At least one snap area associated with one or more links is defined, where the snap area includes a region extending beyond the boundaries of the particular link. Movement of a graphical selection tool, such as a cursor, is facilitated to allow a user to move the selection tool over the snap area of a target link. One or more characteristics of the target link are modified when the graphical selection tool is hovering within the snap area of the target link, thereby indicating that the target link may be selected by the user.

In accordance with more particular embodiments of such a method, multiple snap sizes for a given link may be defined. Each of the snap area regions extend beyond the boundaries of the particular link, and each of the snap areas are of a different size. One of the snap areas associated with the target link is activated, based on predetermined parameters such as the number of times the user has previously selected that target link. For example, a first snap area may be active at a first time, and after the user has selected the corresponding link a predetermined number of times, a second snap area may be activated. In one embodiment of the invention, this second snap area is larger than the first area, in order to ease selection of the links that are selected most often by the user. The snap areas may be predefined, such as by defining a minimum, maximum, and possibly one or more intermediary snap areas. Alternatively, a first snap area can be defined, and other snap areas can be defined relative to the first snap area by creating the other snap areas based on a snap step size relative to the first snap area. In other particular embodiments, the target link characteristics that can be changed range widely, and include characteristics such as the color, link size, text characteristics, etc. of the target link presented on the display. In other more particular embodiments, the method includes providing feedback perceivable by user, where the feedback indicates that the link has been identified and is available for selection by the user. Such feedback may be in any desired form, including tactile feedback such as a vibration, and/or audio feedback such as a beep, click, etc., and/or visual feedback such as a visual pop-up item. Any of the snap areas, feedback types, etc. may be configured in advance, or configured at any time by the user. In yet another particular embodiment, the method includes automatically moving the graphical selection tool to the target link when the graphical selection tool is hovering within the snap area of the target link, in order to position the graphical selection tool in a position where the actual link may be specifically selected.

In accordance with another embodiment of the invention, an apparatus is provided for facilitating user selection of links presented on a display. The apparatus includes a memory to store at least a hover application and at least one snap area associated with one or more links, where the snap area is larger than an area occupied by the link. A display is provided to visually present the links. A processor is coupled to the memory and to the display. The processor is configured to execute the hover application to facilitate movement of a graphical selection tool over the snap area of a target link on the display, to modify at least one characteristic of the target link when the graphical selection tool has hovered within the snap area of the target link, and to enable user selection of the target link once the graphical selection tool has hovered within the snap area of the target link.

In accordance with another embodiment of the invention, a system is provided for facilitating user selection of Internet links on electronic devices. The system includes a server to generate at least one web page for transmission via a network, where the web page includes at least one selectable link. An electronic device is included, such as a wireline computing system, a wireless computing system, a wireless communication device such as a mobile telephone, personal digital assistant, etc. The electronic device is coupled to the network, where the network can be an intranet, Internet, or other network. The electronic device includes a memory to store at least a hover application and at least one snap area associated with the selectable link, where the snap area is larger than an area occupied by the selectable link. A display is provided to display the selectable link. The electronic device also includes a processor coupled to the memory and to the display. The processor is configured to execute the hover application to facilitate movement of a graphical selection tool over the snap area of the selectable link on the display, to modify at least one characteristic of the selectable link when the graphical selection tool has hovered within the snap area of the selectable link, and to enable user selection of the selectable link when the graphical selection tool has hovered within the snap area of the selectable link.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a manner to facilitate user selection of links or other selectable items presented on a device display. One or more snap areas associated with a particular link are defined, where the snap areas encompass a space that is larger than the particular link. In this manner, a user need not be as accurate in selecting a link or other selectable item, since the space available to select that link has been increased. When the user moves a selection tool such as a cursor within this enlarged snap area, an indication is provided to the user, such as by changing the characteristics of the link and/or providing other feedback to the user. When the user has hovered the selection tool within the enlarged snap area, the link can be selected, even though the cursor is not necessarily over the link itself. Multiple snap areas may be associated with or created for a particular link, so that the snap area can be enlarged or reduced in size depending on certain parameters, such as how often the user selects or attempts to select that particular link.

Figure 1:
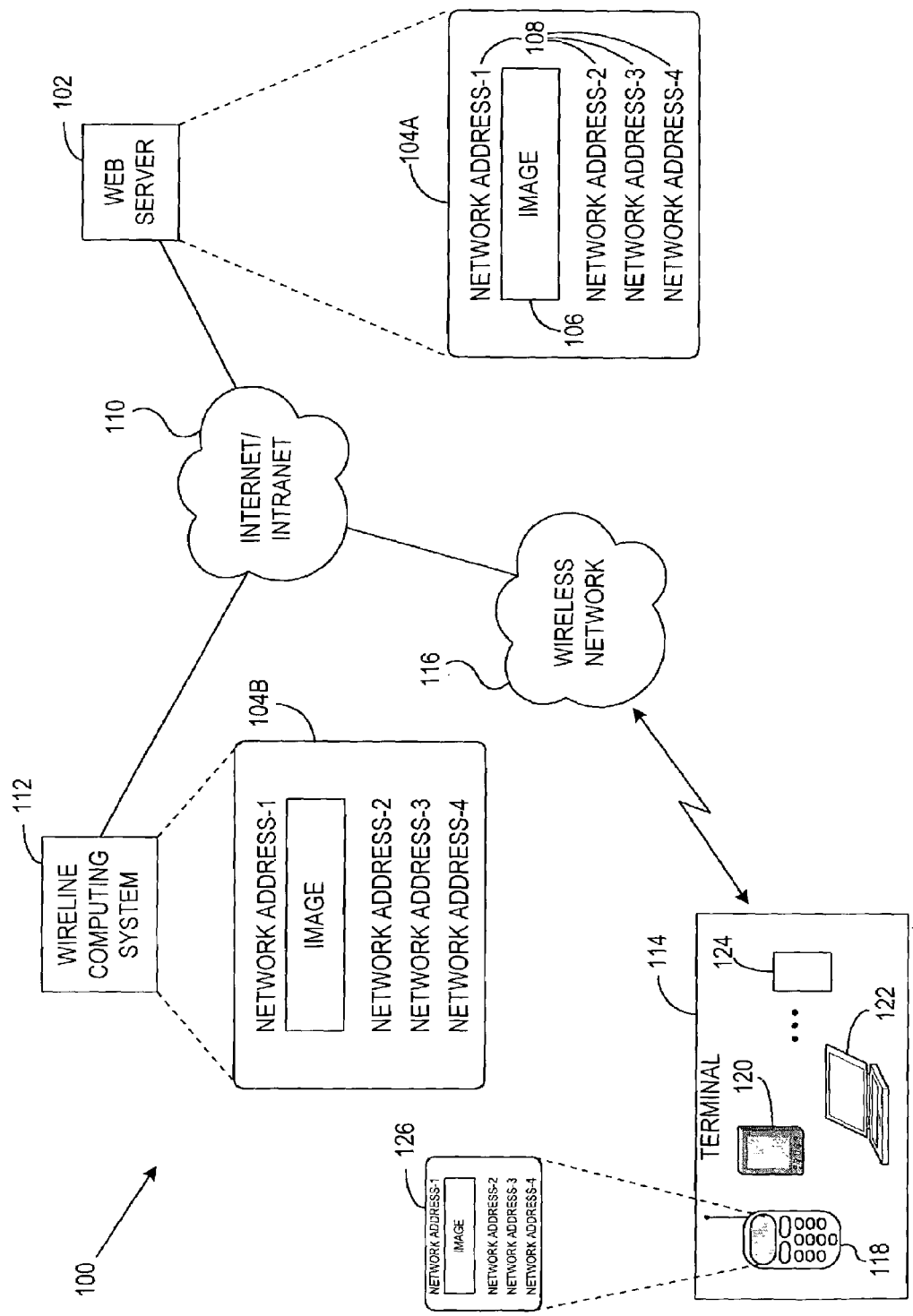
FIG. 1 is a block diagram of a representative networking environment in which the principles of the present invention may be applied.

FIG. 1 is a block diagram of a representative networking environment 100 in which the principles of the present invention may be applied. The present invention is applicable in any environment where client or other communication devices receive (and transmit) information, such as via a direct connection or via landline and/or mobile networks. The simplified networking environment 100 of FIG. 1 is provided for purposes of facilitating an understanding of a system in which the present invention is particularly useful, however it will become apparent to those skilled in the art from the description provided herein that the present invention is applicable in a wide variety of situations where computer "browsing" functionality is employed. The present invention is also applicable to other application programs employing links or other selectable items. For example, word processing programs and other applications may allow links to Internet sites, drives, folders, files, etc. to be embedded into documents, and the present invention is equally applicable thereto.

Both landline (also referred to as "wireline") and wireless computing systems are presently capable of receiving information in a variety of content types and formats. Landline systems, such as desktop computers, workstations, terminals, etc. generally utilize commercially-available Web browsers in order to interact with various kinds of Internet resources. Such a browser is a software program, generally stored locally at the client device. In the Internet context, web content created with Hypertext Markup Language (HTML) or other language can be read by such Web browsers. Analogous technologies exist for communicating landline (e.g., Internet) content via wireless devices. For example, one such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is generally independent of wireless network standards, and is designed as an open standard. WAP bridges the gap between the wireline Internet paradigm and the wireless domain, to allow wireless device users to enjoy the benefits of the Internet across both platforms. Other current and anticipated technologies are also used or contemplated for use in communicating content to and from wireless devices.

One problem facing the telecommunications industry relates to content rendering on mobile devices, where the content was originally intended for rendering on a system such as a workstation or desktop computer. Some of the inherent and desirable characteristics of handheld or other portable terminals, including their relatively small size, presents a dilemma when attempting to render content on a mobile terminal display that may be significantly smaller than their desktop counterparts. For example, a web server 102 may host a web page, such as the representative web page 104A. Web pages may include a number of different elements, such as text, links, images, banners, frames, tables, etc. The representative web page 104A of FIG. 1 includes an image 106 and a number of different links 108. The web page content is often designed for consumption by devices coupled to a network, such as an intranet or the Internet 110. Web page or other content provided via the Internet is often with the intention of being viewed by a corresponding computer system, such as the wireline computing system 112. Thus, the wireline computing system 112 can appropriately present the web page 104B, because the content can be rendered and displayed on the computing system 112 display, which is generally a suitable size for viewing such web pages.

Further, desktop computers, workstations, and other wireline computing systems 112 are generally equipped with extensive user input capabilities, including text entry using high key-count alpha-numeric keyboards, graphical user interface (GUI) using pointing mechanisms such as a mouse or joystick, touch screens, and the like. This, coupled with the relatively large viewing space provided by many computing systems 112, facilitates maneuverability and selection of items (e.g., links) on a web page 104B.

However, Internet and other network content can now be provided to mobile terminals 114 as well as landline computers. Thus, Internet content provided by a web server 102 or other content source may ultimately be provided to a mobile terminal 114 via one or more wireless networks 116. The mobile terminal 114 may include any type of wireless device, such as a cellular/mobile telephone 118, a personal digital assistant (PDA) 120, a notebook or laptop computer 122, or any other type of terminal represented by device 124. For such devices, the display elements 126 are generally smaller and have lower resolutions than that of a landline computer. Furthermore, mobile devices are generally intended to be small, portable, and often hand-held devices, which have limited space in which to provide keys, buttons, or other user input mechanisms. This significantly reduces the input capabilities of such devices compared to larger desktop systems.

In order for such display elements to display the Internet content, the content must be scaled down when rendered onto the smaller mobile device screen. Because the content may be significantly reduced in size, it is more difficult to "select" elements on the display 126, as the selectable elements occupy less area and therefore require more precise cursor placement when selecting such elements. Further, when a web page is rendered onto a smaller screen, the screen may become cluttered with a number of hyperlinks, making it difficult to tell which link is actually going to be selected by the user. In some cases where the links are significantly reduced in size, the cursor size itself may become an impediment to accurate positioning of the cursor. This is because the cursor is larger relative to the reduced-size link than that for the desktop computer situation. In other words, the cursor itself may actually straddle multiple links, making it very difficult to know which link is currently associated with the cursor. Because mobile terminals 114 generally include limited input capabilities, the problem may be exacerbated as the input capabilities of a device is a factor in how precise a cursor can be positioned on the display. The inability to precisely position a cursor over a desired link can be frustrating to the user, not to mention that it significantly impacts the speed to which a user can browse various web sites via links.

Furthermore, whether on a mobile terminal 114 or larger wireline computer system 112, it is often difficult to precisely place cursors or otherwise select selectable items, such as links (e.g., hyperlinks). This may be due to a number of reasons, including the size of the links provided via the web page or other content, the quality of user-input tools such as a mouse, joystick, touch screen, touch pad, etc. However, it may also be the result of the user himself/herself. For example, people with disabilities may have a difficult time precisely positioning cursors, even where the displayed links are relatively large and otherwise accessible. Therefore, even on desktop computing systems 112 where the information is rendered in its originally-intended size as shown by web page 104B, it may be difficult for disabled individuals to accurately manipulate the particular user input mechanism over a link. Where the input capabilities and display size are limited as they are with many mobile terminals 114, it is even more difficult for disabled individuals to accurately position cursors over desired links.

The present invention provides a solution to this problem by providing a smart hover capability to browsers, regardless of what platform such a browser is operating on. For example, browsers operating on wireline computing systems 112 and/or wireless terminals 114 can equally benefit from the smart hovering functionality provided in accordance with the present invention.

Figure 2:
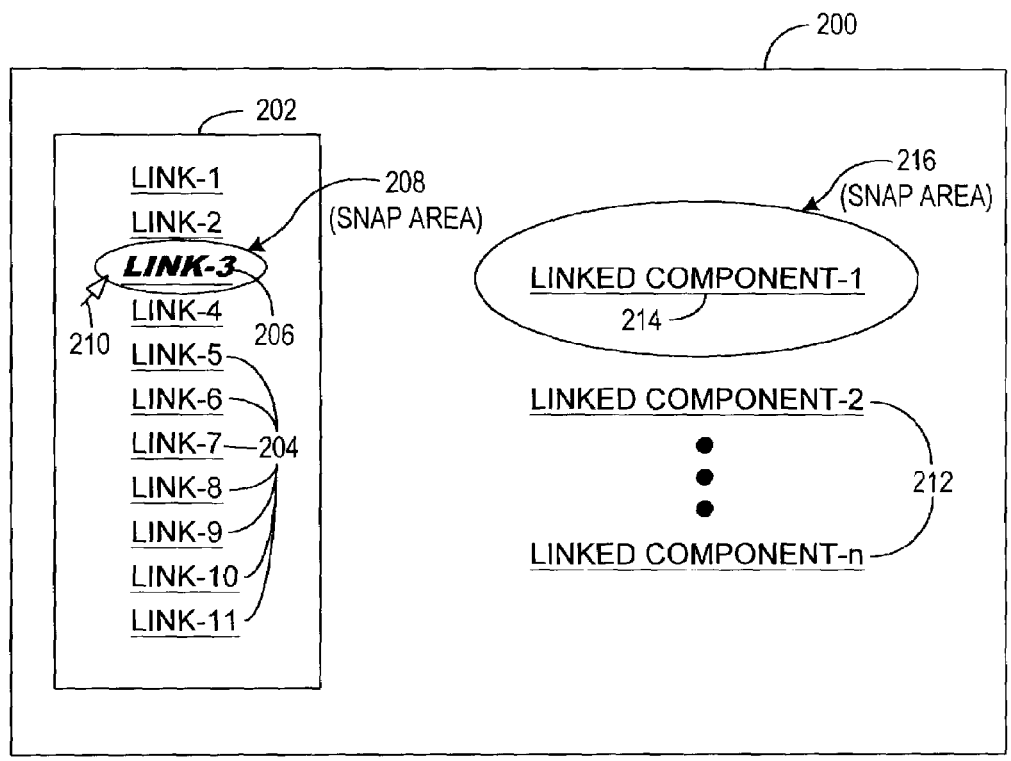
FIG. 2 is a block diagram illustrating a representative smart hover browser feature in accordance with one embodiment of the present invention.

In accordance with the present invention, a smart hover browser feature is provided. With smart hover activated, any hyperlinked component will be highlighted or otherwise distinguished from its original state when the cursor is over, or within a configurable distance of, the linked component. FIG. 2 is a block diagram illustrating a representative smart hover browser feature in accordance with one embodiment of the present invention. A representative web page 200 is shown, although the present invention is applicable to any content including links, whether Internet hyperlinks, local application file links, etc. The web page 200 may include text, links, images, banners, frames, tables, etc. For purposes of facilitating an understanding of one embodiment of the invention, the illustrated web page 200 is shown only with links.

A first set of links 204 is shown in link area 202. These links 204 represent any type of link, such as an Internet web page hyperlink. In accordance with the present invention, each link (or predetermined links) is associated with an area referred to herein as the "snap area." The snap area represents a region proximate the actual visible link, such as a region surrounding the link, or adjacently situated above, below, and/or beside the link. In one embodiment, the snap area associated with each link surrounds the link on all sides to a predetermined distance beyond the actual, visible link. For example, one link shown as LINK-3 206, shows a snap area 208 surrounding the link 206. This area encompasses a space extending beyond the actual link. When a cursor 210 or other selection mechanism encroaches the snap area 208, the link 206 will be activated, even though the cursor 210 may not physically be over the link 206.

In accordance with one embodiment of the invention, when the cursor 210 enters the snap area 208, the link component will be highlighted or otherwise distinguished from its original state. For example, when the cursor 210 enters the snap area 208, the LINK-3 link 206 may change to a different color, which may be set by default or set by the user. Other distinguishing characteristics may be used in addition, or in lieu of, changing the color. For example, the link 206 size may be increased, the link 206 font may be changed, the link 206 may be bolded or italicized, etc.

In accordance with another embodiment of the invention, additional feedback may also be provided in addition to the visual link 206 change. Tactile feedback and/or audio/visual alert attributes can be activated and associated with the snap area. For example, substantially contemporaneously with the change in link color, font, etc., tactile feedback such as a vibration in a mobile terminal, and/or an audio/visual alert may set to occur. Examples of audio alerts include a click, beep, ring tone, song, recorded voice, or other audible alert. Example of visual alerts include a pop-up visual icon or other indicia presented somewhere on the display screen, such as proximate the link 206 itself, or at some other predetermined location on the display screen. Such pop-up visual icon/indicia may, for example, a symbol and/or a larger display of the link text. This feedback indicate to the user that the linked component has now been identified and can be selected. In other words, when the cursor 210 has entered the snap area 208, the link can be selected, and user knowledge of entry into the snap area 208 is assisted by modifying the link text itself and/or providing feedback as set forth above.

In accordance with another embodiment of the invention, the snap area 208 size can be changed. This is illustrated in connection with other linked components shown on web page 200. A number of linked components 212 may be available on the web page 200. One such linked component, shown as LINKED COMPONENT-1 214 has an associated snap area 216, which in the illustrated embodiment is an area surrounding the link 214. The snap area for this particular link 214 is relatively large, allowing the user to easily highlight and select the link 214.

In one embodiment, the snap area size is configured, either in advance or during continued use, in order to suit the user's requirements. This would be an example of a "fixed" snap area. For example, the snap area 216 may be fixed to a certain area associated with a link 214, whether configured in advance or otherwise.

In another embodiment, snap areas such as snap area 216 can be set to intelligently vary in size depending on whether the browser recognizes the link 214 due to one or more previous user selections of the link 214. For example, where a link has previously been used/accessed by the user, the snap area can be set to a large snap area size. Where a link has not previously been used/accessed by the user, the snap area will remain at its current size. Maximum and minimum snap areas can be configured in advance, and/or by the user. The number of times the link is to be used before increasing the snap area to the large size can also be configured.

In accordance with the invention, the snap area can also include intermediary snap areas between the minimum and maximum snap areas described above. The snap area can be changed to different sizes, depending on, for example, how often a link has been used by the user. In such an embodiment, the more a link has been used by the user, the larger the snap area. The less frequently a link has been used by the user, the smaller the snap area. If the link has not been used at all, the snap area will be set to a predetermined or currently-selected minimum. The snap area increment or "step size" to be used for size variation can be configured through attributes by the user. The value of the number of times the link has been used before a snap area change occurs is also configurable through attributes.

Referring to FIG. 2, the snap area 208 is illustrated as a small snap area, indicating that no previous selections (or very few selections) of link 206 have occurred. On the other hand, the snap area 216 is illustrated as a relatively large snap area. In one embodiment, this relatively large snap area 216 indicates that link 214 has been selected one or more times, depending on the particular embodiment. For example, a first embodiment involves increasing the snap area 216 to a maximum size where a single selection of a link 214 has occurred. In another embodiment, the current snap size 216 may be somewhere between the minimum and maximum snap area size, where the implementation allows for incrementally increasing snap areas.

The snap area can also be decreased based on certain parameters. For example, if a snap area has been increased due to one or more accesses of a particular link, the snap area can subsequently be reduced over time. As a more specific example, a snap area may be decreased by one predetermined step size for each predetermined time period (e.g., one week) in which the link is not accessed. As another specific example, the snap area may be reduced all the way back to the minimum size (as if the link had never been accessed), after expiration of a predetermined time period such as one month. In accordance with the present invention, the user can also manually set a snap area back to its original, pre-access, size. Snap area size variations are described in greater detail in connection with FIG. 3.

Figure 3:
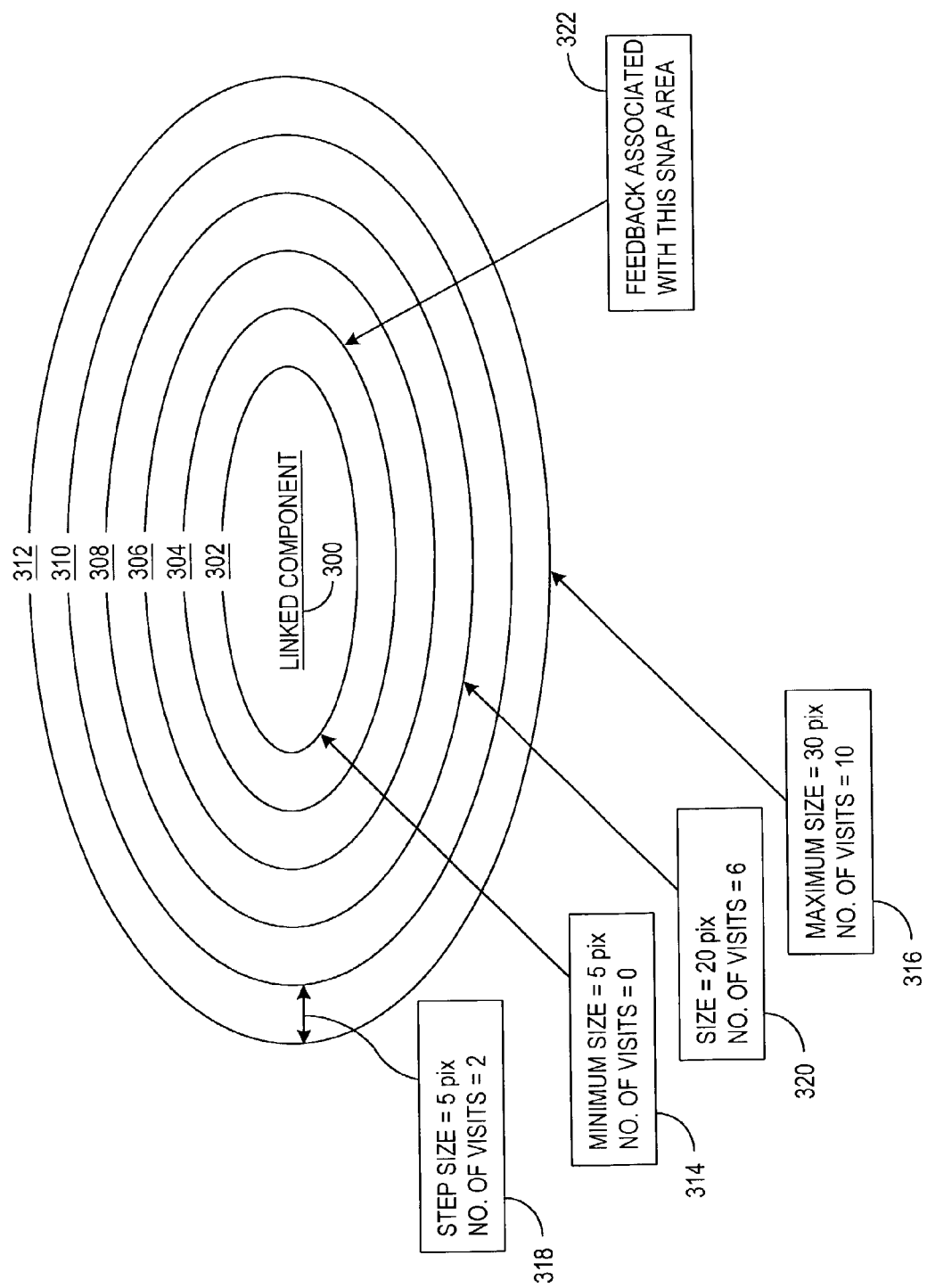
FIG. 3 illustrates an exemplary manner in which the snap area may be changed depending on the frequency of link use in accordance with the present invention.

FIG. 3 illustrates an exemplary manner in which the snap area may be changed depending on the frequency of link use in accordance with the present invention. The linked component 300 represents a selectable link, such as an Internet hyperlink. In this example, multiple levels of snap areas are implemented, including snap areas 302, 304, 306, 308, 310, and 312. While any desired number of snap area levels may be implemented, the illustrated embodiment includes six different levels. The first snap area 302 represents the minimum snap area for this embodiment. This snap area 302 represents, for example, the snap area associated with a link 300 which has never been selected by the user (i.e., number of visits=0). It should be noted that the minimum snap area could, in other embodiments, be limited to the actual link 300 itself. However, in the illustrated embodiment, the minimum snap area size is configured to include the actual link 300 and five pixels beyond the link 300 as shown at block 314. Thus, when the user moves a cursor or other selection tool to within five pixels of the link 300, the link will be activated and available for selection by the user.

Snap area 312 represents the maximum snap area, which in this embodiment is set to thirty pixels from the linked component 300, as illustrated at block 316. Therefore, if the current snap area is set to the maximum snap area 312, the link 300 will be activated and available for selection by the user when the cursor is moved within thirty pixels of the link 300.

In accordance with the present invention, any number of snap areas may be configured. In the illustrated embodiment, six snap areas are configured, separated by five pixels as indicated by the step size of five pixels shown at block 318. Therefore, each time an increase in snap area occurs, the link is allotted another five pixels of link activation space. As the snap area increases, it becomes easier for the user to activate the link, since the cursor can be increasingly farther away from the link 300 while still activating the link 300.

The current snap area can be set in a number of ways in accordance with the invention. In one embodiment, the snap area increases each time the link 300 is selected by the user a predetermined number of times. For example, the step size may be set to five pixels, where the snap area step increases every second time the user selects the link 300. In other words, the trigger to the next available snap area is two more visits, as illustrated at block 318 showing the step trigger corresponding to a number of visits equal to two.

In practice, if the user has never selected the link 300, the minimum snap area 302 will be active. When the user moves the cursor to within five pixels of the link 300, the link 300 will be activated and available for selection by the user. When the user has selected the link 300 twice, the snap area will automatically increase to the next snap area 304. At this new snap level which is five pixels further from the link 300 than snap area 302, the link 300 will be activated and available for selection when the cursor is moved to within ten pixels of the link 300. This continues for each snap area, based on the number of link 300 visits (i.e., link selections) made by the user. For example, when the user has visited the link six times, the snap area 308 will be activated at twenty pixels from the link 300, as illustrated at block 320. At snap area 308, the link 300 will therefore be activated and available for selection when the cursor is moved to within twenty pixels of the link 300. This continues until the maximum snap area (as configured) is reached, which is snap area 312.

Feedback, as previously described, can be associated with any one, more, or all of the different snap areas. For example, feedback may be associated with snap area 304, as illustrated at block 322. This feedback may include tactile feedback such as mobile terminal vibration. The feedback may additionally or alternatively include audio and/or visual feedback, such as audio clicks, beeps, tones, songs, pop-up icons, increases link font size, etc. Feedback can be used at any or all snap areas, and the feedback implemented may be the same for all snap areas or may be different for one or more of the snap areas. For example, visual feedback such as a pop-up window showing an enlarged link 300 may be used at snap areas 302 and 304, while an audio "click" may be used at the remaining snap levels 306, 308, 310, 312. Any number of combinations of feedback may be implemented.

In another embodiment of the invention, entry into an activated snap area may automatically pull the cursor to the link 300, rather than having the snap area essentially extend the reach of the link as described above. In other words, the above description indicates that when the cursor enters an active snap area, the link is activated, even though the cursor remains outside of the actual link 300. In another embodiment, a "snap-to-link" feature is utilized. If this feature is utilized, the cursor will automatically be moved to the actual link 300 when the cursor reaches the active snap area. As a more particular example, assume that snap area 312 is active. Using the snap-to-link feature, the cursor will be moved to the link 300 when the cursor is within thirty pixels of the linked component 300. While having the same result as the previously described embodiments, the snap-to-link embodiment activates the link 300 by actually moving the cursor to that link 300, rather than extending the reach of the link itself.

It is noted that the particular step sizes, number of visits to increase the snap area, minimum and maximum pixel distances, etc. shown in FIG. 3 are provided for purposes of facilitating an understanding of this aspect of the invention. It will be readily apparent to those skilled in the art from the description provided herein that other step sizes, link visit counts, minimum/maximum pixel distances, and so forth can be different from those described in connection with FIG. 3. Further, snap areas need not be based on pixels, but can be based on other parameters such as actual or relative distances, X-Y coordinates, or any other positioning parameters.

Figure 4:
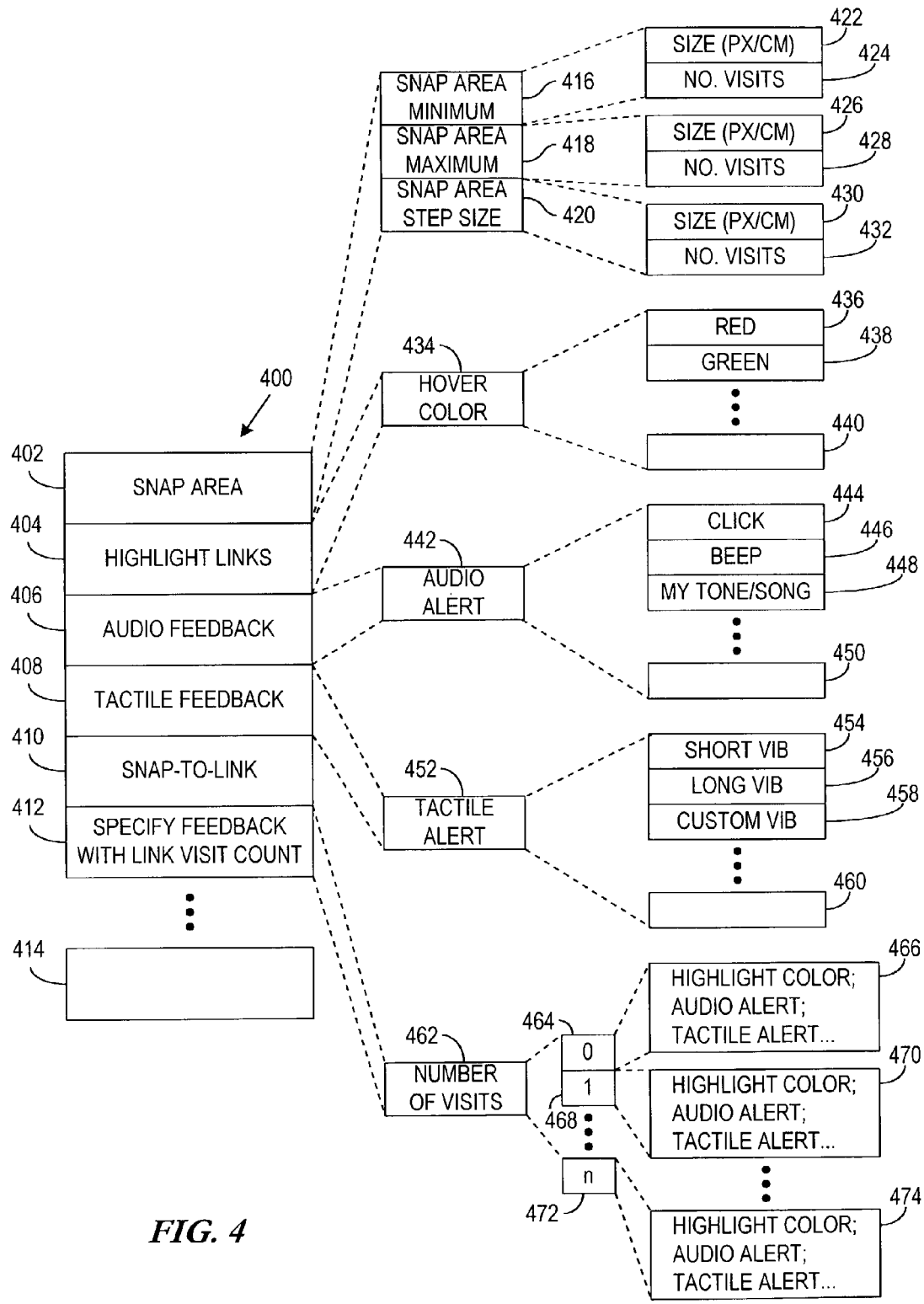
FIG. 4 illustrates one exemplary manner in which a user can configure the smart hover browser operation in accordance with the present invention.

Any desired hover settings in accordance with the present invention may be configured in advance, and/or may be configured by the user. When made by the user, the configuration may be effected using any known user interface mechanism available on the particular computing device or mobile terminal. FIG. 4 illustrates one exemplary manner in which a user can configure the smart hover browser operation in accordance with the present invention. In this embodiment, the user interface employed is a menu-driven graphical user interface (GUI). Again, it should be noted that any user interface mechanism may be utilized, including text entry, audio commands, button actuation, touch screen input, etc.

The sample menu shown in FIG. 4 illustrates representative configuration items that may be used in connection with the smart hover browser operation in accordance with the invention. These representative configuration settings are intended to be illustrative of how such configurations may be set, and many variations of configuring the smart hover browser operation may be implemented. Therefore, the sample menu of FIG. 4 is provided for purposes of facilitating an understanding of the invention, and the present invention is clearly not limited to the illustrated configuration settings.

A main menu 400 may include a number of menu items, including a snap area item 402, highlight links item 404, audio feedback item 406, tactile feedback item 408, snap-to-link item 410, specify feedback item 412, and/or other menu items 414. The snap area item 402 allows the user to specify whether or not snap areas will be used. If the user indicates that snap areas are to be used, the user can then specify certain attributes associated with such snap areas. For example, a sub-menu may be presented, providing the user with the ability to specify the minimum size, maximum size, and step size of the snap areas via sub-menu items 416, 418, 420 respectively. In specifying the minimum snap area, the user can enter the minimum snap area size 422 (e.g., in pixels, centimeters, or other measurement units) as well as the number of visits 424 (i.e., link selections) corresponding to the minimum snap area. Similarly, the size 426 and number of visits 428 corresponding to the maximum snap area can be defined, as well as the step size 430 and the number of visits 432 corresponding to a snap area step size. For example, a maximum size 426 may be set to thirty pixels, and the number of visits 428 may be set to ten visits to reach the maximum snap area. As another example, the step size 420 separating adjacent snap areas may be set to five pixels, and the number of visits 432 separating adjacent snap areas may be set to two visits.

Selection of the highlight links menu item 404 may present one or more sub-menu items to the user, from which the manner of highlighting an activated link may be designated. As previously indicated, other characteristics could be used in addition to, or instead of, a color. Such characteristics include link font, link character weight (e.g., bold), link style (e.g., italics), and the like. In the illustrated embodiment, link hover color 434 is the only illustrated sub-menu item, selection of which allows the user to set the color to which the link will change when the user has moved the cursor within the currently active snap area. The user may designate the desired color, such as red 436, green 438, or other color 440.

The audio feedback menu item 406 may present one or more sub-menu items to the user, from which the manner of providing audio feedback may be designated. One manner of providing audio feedback is through an audio alert 442, where the user can designate a particular audio feedback item, such as a click 444, beep 446, tone or song 448, or other audio item 450. Similarly, the tactile feedback menu item 408 may present one or more sub-menu items to the user, from which the manner of providing tactile feedback may be designated. One manner of providing tactile feedback is through a tactile alert 452, where the user can designate a particular tactile feedback item, such as a short vibration 454, long vibration 456, customized vibration 458, or other tactile feedback item 460.

As previously described, a snap-to-link feature may be activated. This feature may be activated by selecting the snap-to-link menu item 410, and indicating that this feature should be turned on. If this occurs, the cursor will snap to the actual link when the cursor enters the currently active snap area.

Another illustrated menu item 412 allows the user to specify whether feedback will be associated with the number of times the links are visited. If the user specifies that feedback will be used, the user can specify feedback for any number of visits via sub-menu item 462. For example, for zero visits 464 (i.e., link not yet visited), the user can identify the highlight color, audio alert, tactile alert, and/or other parameters as shown at sub-menu item 466. Similarly, when the link has been visited once 468, the user can identify the highlight color, audio alert, tactile alert, and/or other feedback parameters for that number of visits as shown at sub-menu item 470. This can continue for up to "n"472 visits, where the user can again identify the highlight color, audio alert, tactile alert, and/or other feedback parameters for that number of visits as shown at sub-menu item 474. The feedback parameters 466, 470, 474 may be made the same for all numbers of visits 464, 468, 472, or may be selected individually for any one or more numbers of visits 464, 468, 472.

Figure 5:
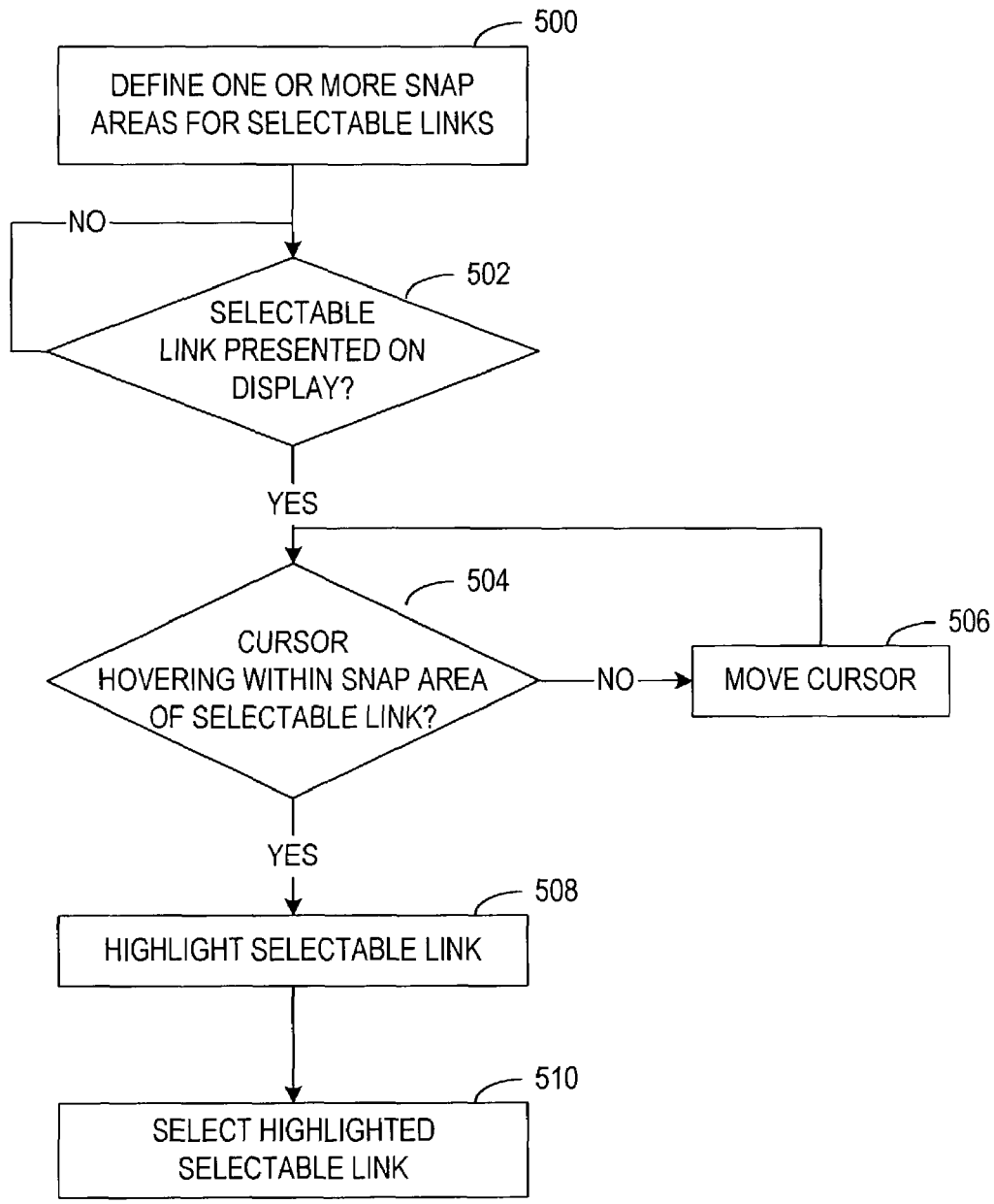
FIG. 5 is a flow diagram illustrating an exemplary method for facilitating link selection in accordance with the present invention.

FIG. 5 is a flow diagram illustrating an exemplary method for facilitating link selection in accordance with the present invention. One or more snap areas are defined 500 for selectable links. For example, snap areas may be defined for Internet hyperlinks. The snap areas include the actual link area, as well as an extended area beyond the selectable link. When a selectable link is presented on the device display as determined at decision block 502, it is determined 504 whether the device cursor or other selection tool is positioned within the defined snap area. If not, the cursor may be moved 506 until it is within the defined snap area. If the cursor is hovering within the defined snap area, the selectable link is highlighted 508, and the highlighted selectable link is selected 510 by the user. Selection 510 of the highlighted link may be accomplished by clicking a mouse button, pressing one or more buttons or keys, or by any other user-interface mechanism.

Figure 6:
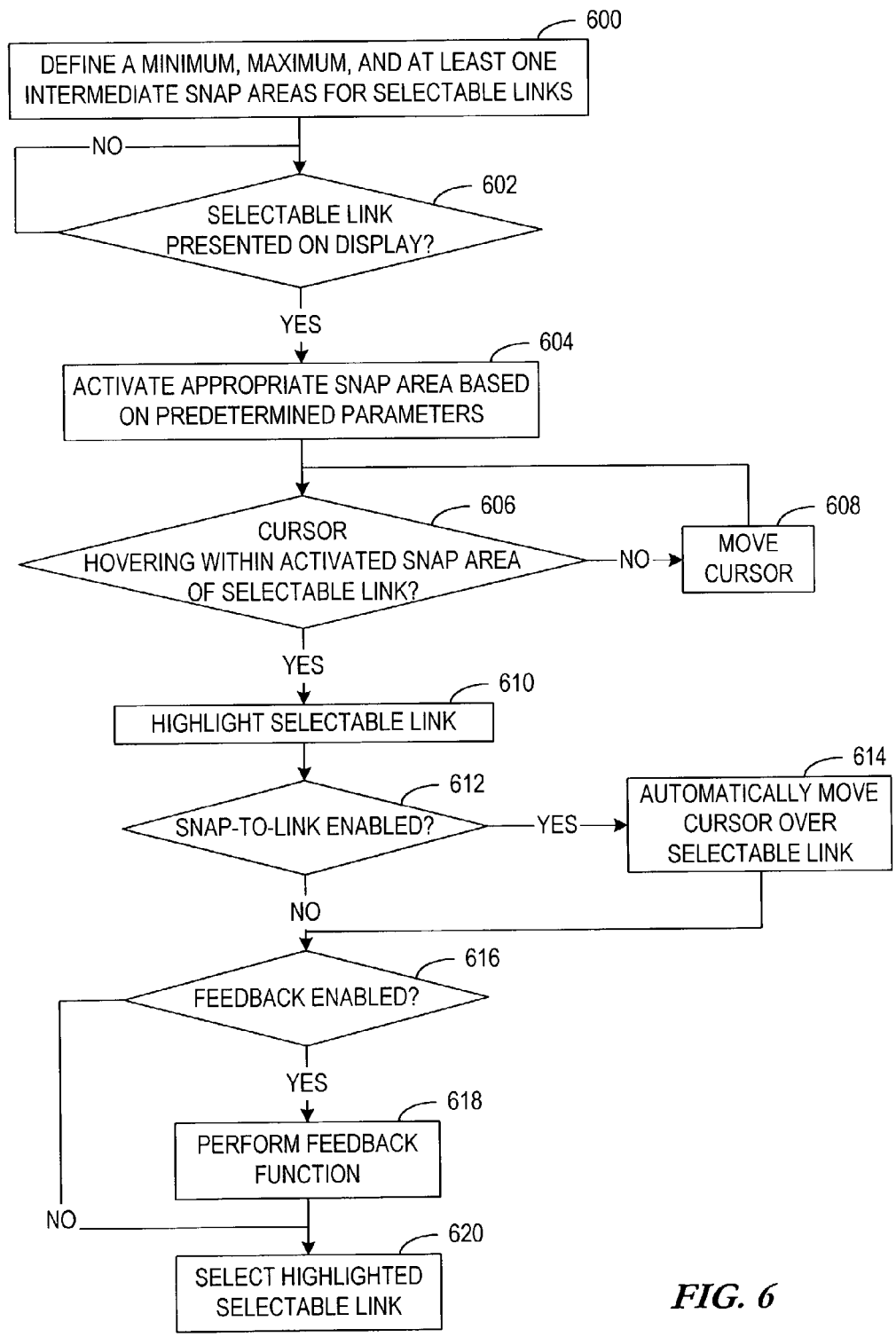
FIG. 6 is a flow diagram illustrating another exemplary method for facilitating link selection in accordance with the present invention.

FIG. 6 is a flow diagram illustrating another exemplary method for facilitating link selection in accordance with the present invention. A minimum snap area, maximum snap area, and at least one intermediate snap area are defined 600 for selectable links. The minimum snap area is the area including the actual link, as well as a first extended area beyond the selectable link. The maximum snap area is the area including the actual link, as well as a second extended area beyond the selectable link. The second extended area associated with the maximum snap area is greater than the first extended area associated with the minimum snap area. The minimum snap area represents the smallest snap area associated with the links, while the maximum snap area represents the largest snap area associated with the links. The intermediate snap area is the area including the actual link, as well as a third extended area beyond the selectable link, where the third extended area is greater than the first extended area associated with the minimum snap area, but less than the second extended area associated with the maximum snap area. Any desired number of such intermediate snap areas may be defined 600.

When a selectable link is presented on the device display as determined at decision block 602, the appropriate snap area is activated 604, based on predetermined parameters. For example, the predetermined parameters may include a number of times that link was selected in the past. Based on this information, either the minimum snap area, maximum snap area, or any one of the intermediate snap areas will be activated and used as the current snap area for that particular link. Previously-selected links may be stored in local (and/or remote) memory to serve as the basis for comparison to links currently presented on the display. Once a snap area has been activated, it is determined 606 whether the device cursor or other selection tool is hovering within the activated snap area of that link. If not, the cursor may be moved 608 until it is within the activated snap area. If the cursor is hovering within the defined snap area, the selectable link is highlighted 610.

If the snap-to-link feature is enabled as determined at decision block 612, the cursor is automatically moved 614 over the actual selectable link. Whether or not the snap-to-link feature has been enabled, it is then determined 616 whether one or more feedback mechanisms are enabled. If not, the highlighted selectable link is selected 620 by the user. If one or more feedback mechanisms are enabled, the appropriate feedback function is performed 618, and the highlighted selectable link is selected 620 by the user.

Figure 7:
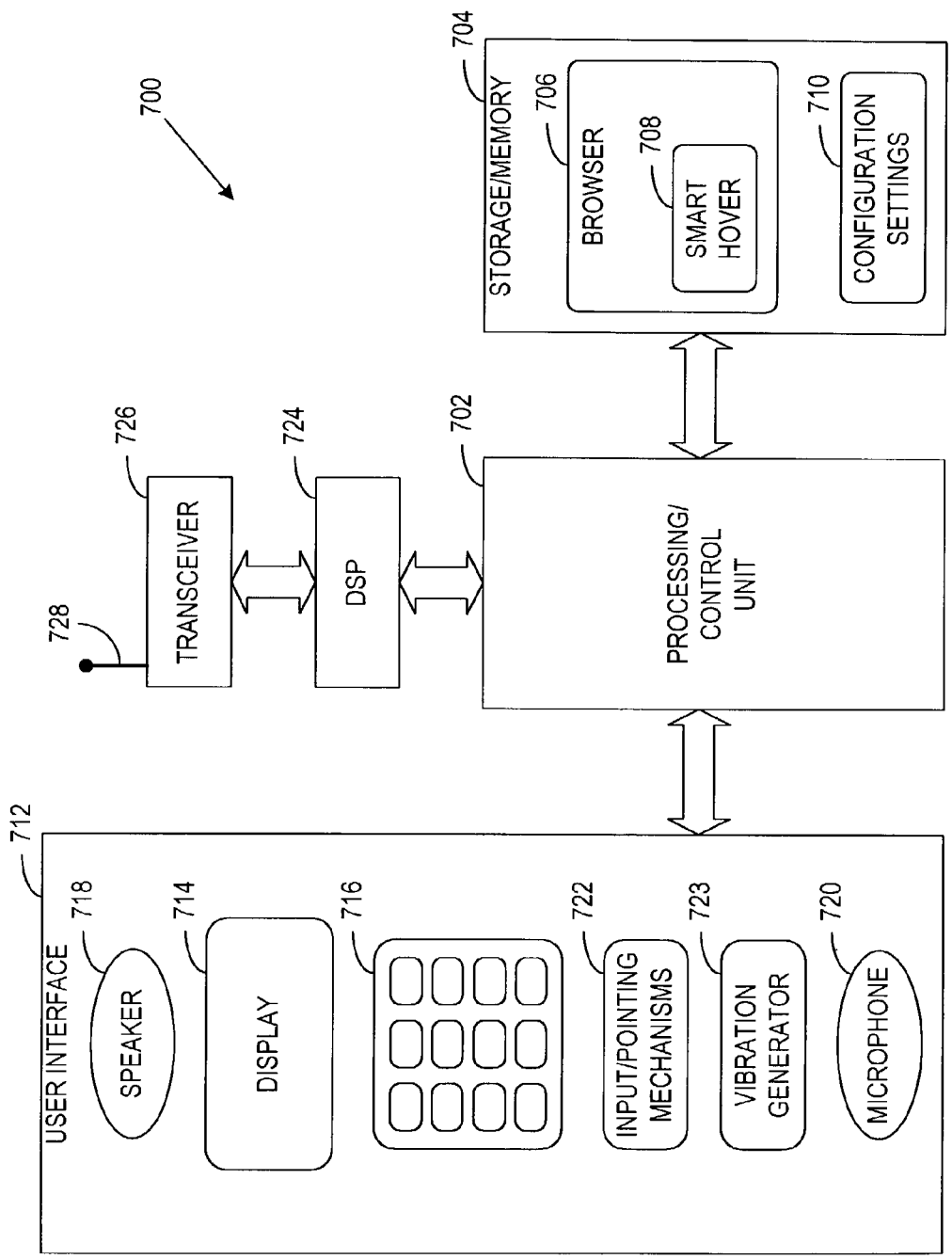
FIG. 7 illustrates a representative mobile terminal computing system capable of carrying out operations in accordance with the invention.

As previously indicated, the present invention is applicable to any browser software or other application module capable of presenting links, where selection of the link directs the device to a site, file, or other location identified by the link. For example, the present invention may be used in connection with an Internet browser used on desktop or other wireline computing systems. The present invention may also be used in connection with mobile device browsers. Due to the limited display size and input capabilities of mobile terminals, the present invention is particularly beneficial for use with such mobile terminal browsers. The mobile terminals described in connection with the present invention may be any number of wireless devices incorporating browser functions, such as wireless/cellular telephones, personal digital assistants (PDAs) or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various functions, display presentations and operations described herein. An example of a representative mobile terminal computing system capable of carrying out operations in accordance with the invention is illustrated in FIG. 7. From the description provided in connection with FIG. 7, those skilled in the art will readily appreciate the manner in which the present invention may be implemented on other systems, such as desktop computers, workstations, mainframe computer terminals, and other wireline computing systems.

The exemplary mobile computing arrangement 700 suitable for performing the smart hovering operations in accordance with the present invention includes a processing/control unit 702, such as a microprocessor, reduced instruction set computer (RISC), or other central processing module. The processing unit 702 need not be a single device, and may include one or more processors. For example, the processing unit may include a master processor and associated slave processors coupled to communicate with the master processor.

The processing unit 702 controls the basic functions of the mobile terminal as dictated by programs available in the program storage/memory. Thus, the processing unit 702 executes the functions associated with the smart hovering of the present invention. More particularly, the program storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The browser 706, smart hover module 708, and/or configuration settings 710 may also be transmitted to the mobile computing arrangement 700 via data signals, such as being downloaded electronically via a network, such as the Internet and intermediary wireless networks.

One of the programs that may be stored in the storage/memory 704 is a browser program 706. The browser program 706 facilitates user access to content, such as Internet content and web pages. Associated with the browser 706 is a smart hover module 708 in accordance with the present invention, which in the illustrated embodiment is implemented in software and/or firmware operable by way of the processor 702. Other applications other than browser applications may also be locally stored, where these applications also present links or other selectable items to the user via a display. For example, some applications may allow links to be created in a document, such as a word processing document. The present invention is equally applicable to any such application, and the browser 706 application of FIG. 7 is merely intended as a representative example of an application utilizing links. The program storage/memory 704 may also be used to store data, such as the various configuration settings 710 in accordance with the present invention. In one embodiment of the invention, the browser 706, smart hover module 708, and configuration settings 710 are stored in non-volatile electrically-erasable, programmable ROM (EEPROM), flash ROM, etc. so that the information is not lost upon power down of the mobile terminal.

The processor 702 is also coupled to user-interface 712 elements associated with the mobile terminal. The user-interface 712 of the mobile terminal may include, for example, a display 714 such as a liquid crystal display, a keypad 716, speaker 718, a microphone 720, and possibly other user input/pointing mechanisms 722. These and other user-interface components are coupled to the processor 702 as is known in the art. The display 714 serves as the mechanism for displaying web pages and other content, including the links described in connection with the present invention. The display 714 may include touch screen technology to facilitate user input, such as selection of links, where touching the touch screen within the particular snap area will activate the targeted link.

The keypad 716 includes alpha-numeric keys for performing a variety of functions, including dialing numbers and executing operations assigned to one or more keys. For example, in accordance with the present invention, the functions associated with the smart hover operation may be configured via the keypad 716. Keys associated with the keypad 716 may also be used for navigating a cursor on the display 714, to facilitate selection of displayed items such as links. Other input/pointing mechanisms 722 may also be used to navigate a cursor or other pointer on the display 714, including a switch(es), mouse, trackball, joystick, or other user interface mechanism. The microphone 720 can also be used for user input and/or navigation, by receiving voice commands for processing by the processor 702. The user interface 712 may also include a vibration generator 723, such as that which is currently known and used as an alert in mobile telephones.

The mobile computing arrangement 700 may also include a digital signal processor (DSP) 724. The DSP 724 may perform a variety of functions, including analog-to-digital (A/D) conversion, digital-to-analog (D/A) conversion, speech coding/decoding, encryption/decryption, error detection and correction, bit stream translation, filtering, etc. The transceiver 726, generally coupled to an antenna 728, transmits and receives the radio signals associated with the wireless device.

The mobile computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and wireline computing environments. For example, the smart hover functionality in accordance with the present invention may be stored in a variety of manners, may be operable on a variety of processing devices, and may be operable in mobile and wireline devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for facilitating user selection of links presented on a display, comprising:
    defining a plurality of user-configurable snap areas associated with a target link, wherein the snap areas each include a configurable region extending beyond the boundaries of the target link, wherein the regions are of different sizes for each of the plurality of snap areas;
    facilitating movement of a graphical selection tool over at least one snap area of the plurality of snap areas;
    modifying one or more characteristics of the target link when the graphical selection tool is hovering within the at least one snap area of the target link, thereby indicating that the target link may be selected; and
    activating one of the plurality of snap areas based on a number of times in which the target link has been selected by a user.

2. The method of claim 1, further comprising deactivating a currently-activated snap area and activating a different one of the snap areas, in response to the user selecting the particular link at least one additional time.

3. The method of claim 1, further comprising facilitating configuration of the plurality of snap areas, including at least one of configuring a minimum snap area, a maximum snap area, and an intermediary snap area.

4. The method of claim 1, further comprising providing feedback perceivable by user, wherein the feedback indicates that the link has been identified and is available for selection by the user, and wherein a type of feedback provided depends on which of the at least one defined snap areas is currently activated.

5. The method of claim 1, wherein defining at least one snap area associated with one or more links comprises defining at least a minimum snap area and a maximum snap area associated with a particular link.

6. The method of claim 1, wherein defining snap areas associated with the target link comprises defining a minimum snap area as a current snap area associated with a particular link.

7. The method of claim 6, further comprising defining at least one snap step size, and redefining the current snap area based on the snap step size relative to the minimum snap area.

8. The method of claim 7, wherein redefining the current snap area comprises repeatedly redefining the current snap area based on the snap step size relative to a previous snap area.

9. The method of claim 8, wherein repeatedly redefining the current snap area based on the snap step size relative to a previous snap area comprises increasing the current snap area based at least in part on an increasing number of times in which the particular link has been previously selected.

10. The method of claim 8, further comprising changing the current snap area based at least in part on a link selection count corresponding to a number of times in which the particular link has been previously selected.

11. The method of claim 8, further comprising defining a maximum snap area that restricts the current snap area to a maximum size.

12. The method of claim 1, further comprising providing feedback perceivable by user, wherein the feedback indicates that the link has been identified and is available for selection by a user.

13. The method of claim 12, wherein providing feedback comprises providing tactile feedback on a terminal used by the user.

14. The method of claim 13, wherein providing tactile feedback comprises providing a vibration via the terminal.

15. The method of claim 12, wherein providing feedback comprises providing an audio alert presented on a terminal used by the user.

16. The method of claim 12, wherein providing feedback comprises providing a visual alert presented on the display.

17. The method of claim 16, wherein providing the visual alert comprises providing a pop-up visual indication.

18. The method of claim 12, further comprising facilitating user definition of a desired feedback type.

19. The method of claim 1, further comprising allowing selection of the target link once the one or more characteristics of the target link have been modified to indicate that the target link may be selected.

20. The method of claim 1, wherein modifying the characteristics of the target link when the graphical selection tool is hovering within the snap area comprises modifying at least one of a color, link size, and text characteristic of the target link on the display.

21. The method of claim 1, further comprising automatically moving the graphical selection tool to the target link when the graphical selection tool is hovering within the snap area of the target link, to position the graphical selection tool in a link selection position.

22. The method of claim 1, wherein defining snap areas associated with the target link comprises facilitating user definition of one of the snap areas.

23. The method of claim 22, wherein defining snap areas associated with the target link further comprises facilitating user definition of at least one snap step size relative to a defined snap area.

24. The method of claim 1, wherein defining snap areas associated with the target link comprises pre-configuring at least one of the snap area, and a snap step size relative to a defined snap area.

25. The method of claim 1, wherein defining snap areas associated with the target link comprises defining at least one of a region surrounding the links, and a region adjacent to the links, as the snap area.

26. An apparatus for facilitating user selection of links presented on a display, comprising:
a memory to store at least a hover application and a plurality of user-configurable _snap areas associated with a target link, wherein the snap areas are configurably larger than an area occupied by the target link, and wherein each of the plurality of snap areas are of different sizes relative to each other;
a display to display the target link; and
a processor coupled to the memory and to the display, wherein the processor is configured to:
execute the hover application to facilitate movement of a graphical selection tool over the snap area of the target link on the display;
modify at least one characteristic of the target link when the graphical selection tool has hovered within the snap area of the target link;
enable user selection of the target link in response thereto; and
activate one of the plurality of snap areas based on a number of times in which the target link has been selected by a user.

27. The apparatus as in claim 26, wherein the processor is further configured to automatically increase a size of at least one snap area associated with the target link each time the target link has been selected a predetermined number of times.

28. The apparatus as in claim 26, wherein the processor is further configured to automatically increase a size of at least one snap area associated with the target link by a predetermined step size each time the target link has been selected a predetermined number of times.

29. The apparatus as in claim 26, wherein the processor is further configured to automatically decrease a size of at least one snap area associated with the target link if the target link has not been selected for a predetermined duration.

30. The apparatus as in claim 26, wherein the processor is further configured to initiate feedback perceivable by the user via the apparatus, wherein the feedback indicates that the target link has been identified and is available for selection by a user.

31. The apparatus as in claim 30, wherein the apparatus comprises a vibration generator to generate a vibration alert in response to the processor initiating the feedback.

32. The apparatus as in claim 30, wherein the apparatus comprises a speaker to generate an audio alert in response to the processor initiating the feedback.

33. The apparatus as in claim 30, wherein the display presents a visual alert in response to the processor initiating the feedback.

34. The apparatus as in claim 30, further comprising a user interface to facilitate configuration of at least one of snap area parameters and feedback types.

35. The apparatus as in claim 26, wherein the hover application is implemented cooperatively with a software application capable of presenting selectable links.

36. The apparatus as in claim 26, wherein the hover application is implemented cooperatively with a browser application.

37. The apparatus as in claim 26, wherein the apparatus comprises at least one of a wireline computing device, a wireless computing device, and a wireless communication device.

38. A system for facilitating user selection of Internet links on electronic devices, comprising:
(a) a server to generate at least one web page for transmission via a network, wherein the web page includes at least one selectable link;
(b) an electronic device coupled to the network, comprising:
(1) a memory to store at least a hover application and a plurality of user-configurable snap areas associated with the at least one selectable link, wherein the snap area is configurably larger than an area occupied by the selectable link, and wherein each of the plurality of snap areas are of different sizes relative to each other;
(2) a display to display the selectable link; and
(3) a processor coupled to the memory and to the display, wherein the processor is configured to:
execute the hover application to facilitate movement of a graphical selection tool over the snap area of the selectable link on the display;
modify at least one characteristic of the selectable link when the graphical selection tool has hovered within the snap area of the selectable link;
enable user selection of the selectable link in response thereto; and
activate one of the plurality of snap areas based on a number of times in which the selectable link has been selected by a user.

39. The system as in claim 38, wherein the network comprises the Internet, and wherein the electronic device comprises a wireline computing system.

40. The system as in claim 38, wherein the network comprises the Internet and the electronic device comprises a wireless terminal, and further comprising at least one wireless network cooperatively coupled to the Internet to facilitate communication of the web page from the server to the wireless terminal.

41. The system as in claim 40, wherein the wireless terminal comprises a mobile communication terminal capable of engaging in at least one of wireless voice communication and wireless data communication.

42. A computer-readable medium having instructions stored thereon and executable by a computing arrangement in an electronic device for facilitating user selection of links presented on a display by performing steps comprising:
defining a plurality of user-configurable snap areas associated with a target link, wherein the snap areas each include a configurable region extending beyond the boundaries of the target link, wherein the snap area regions are of different sizes for each of the plurality of snap areas;

facilitating movement of a graphical selection tool over at least one snap area of the plurality of snap areas;

modifying one or more characteristics of the target link when the graphical selection tool is hovering within the at least one snap area of the target link, thereby indicating that the target link may be selected; and activating one of the plurality of snap areas based on a number of times in which the target link has been selected by a user.

\* \* \* \* \*